United States Patent
Yoon

(10) Patent No.: US 10,902,666 B2
(45) Date of Patent: Jan. 26, 2021

(54) BUFFERING METHOD IN PORTABLE RAY TRACING SYSTEM

(71) Applicant: SILICONARTS, INC., Seoul (KR)

(72) Inventor: Hyung Min Yoon, Seoul (KR)

(73) Assignee: SILICONARTS, INC., Seoul (KR)

( * ) Notice: Subject to any disclaimer, the term of this patent is extended or adjusted under 35 U.S.C. 154(b) by 0 days.

(21) Appl. No.: 16/427,616

(22) Filed: May 31, 2019

(65) Prior Publication Data
US 2020/0327717 A1    Oct. 15, 2020

(30) Foreign Application Priority Data

Apr. 11, 2019    (KR) ................ 10-2019-0042391

(51) Int. Cl.
| | | |
|---|---|---|
| *G06T 15/06* | (2011.01) | |
| *G06T 15/00* | (2011.01) | |
| *G06T 15/04* | (2011.01) | |
| *G06T 15/80* | (2011.01) | |
| *G06T 1/60* | (2006.01) | |

(52) U.S. Cl.
CPC ............ *G06T 15/06* (2013.01); *G06T 1/60* (2013.01); *G06T 15/005* (2013.01); *G06T 15/04* (2013.01); *G06T 15/80* (2013.01); *G06T 2210/21* (2013.01)

(58) Field of Classification Search
CPC ..... G06T 15/06; G06T 15/80; G06T 2210/52; G06T 2210/36; G06F 9/5016
See application file for complete search history.

(56) References Cited

U.S. PATENT DOCUMENTS

2007/0169179 A1* 7/2007 Narad ................ G06F 9/30029
                                                        726/4
2014/0347355 A1* 11/2014 Yoon ...................... G06T 15/06
                                                   345/419
2020/0051318 A1* 2/2020 Muthler ................ G06T 15/005

FOREIGN PATENT DOCUMENTS

| KR | 10-2014-0023615 A | 2/2014 |
|---|---|---|
| KR | 10-1560283 B1 | 10/2015 |

OTHER PUBLICATIONS

Lee et al., SGRT: A Mobile GPU Architecture for Real-Time Ray Tracing, Jun. 19, 2013, HPG 2013, Jul. 19-21, 2013, Anaheim, California. Copyright © ACM 978-1-4503-2135-8/13/07, pp. 109-119 (Year: 2013).*

* cited by examiner

*Primary Examiner* — Samantha (Yuehan) Wang
(74) *Attorney, Agent, or Firm* — Paratus Law Group, PLLC

(57) ABSTRACT

Disclosed is a buffering method in a portable ray tracing system. The buffering method includes: receiving a dynamic acceleration structure from the portable ray tracing apparatus during the process for performing a graphics process; packaging a dynamic object updated by the user terminal with the dynamic acceleration structure and sequentially storing the packaged dynamic object into a buffer area formed in a system memory of the user terminal; when disconnection of the physical connection is detected, performing ray tracing using a graphics processor of the user terminal by loading packaging data from the buffer area and determining a recovery point.

7 Claims, 7 Drawing Sheets

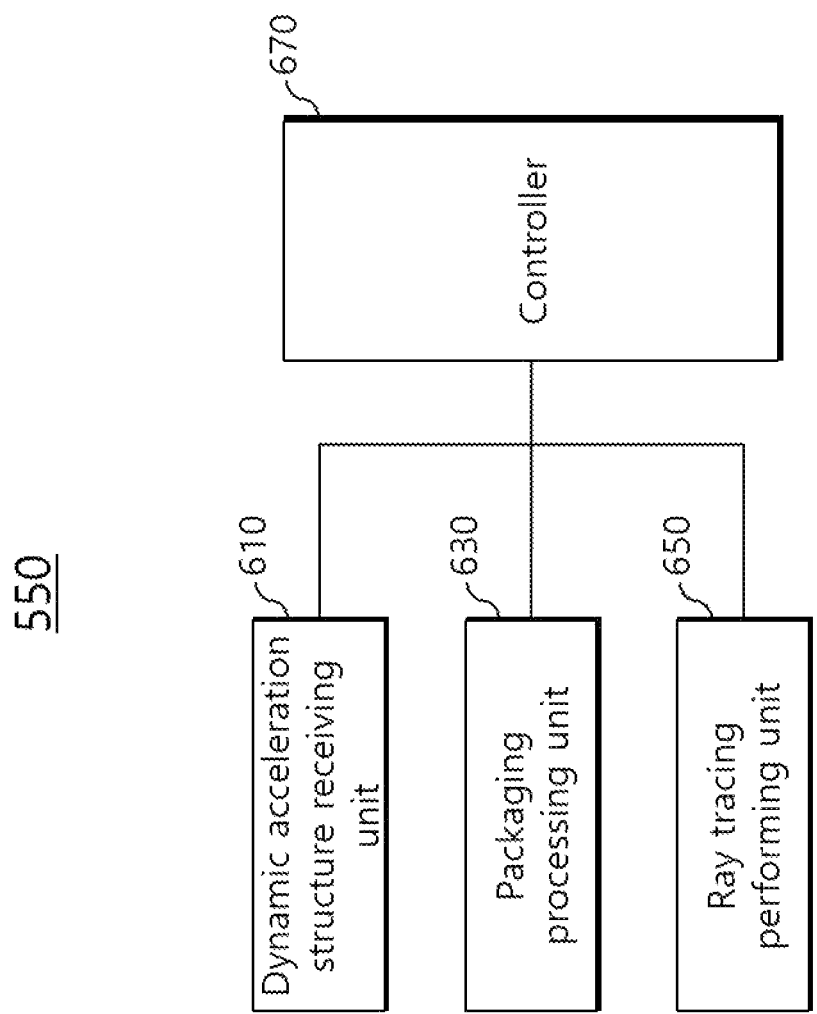

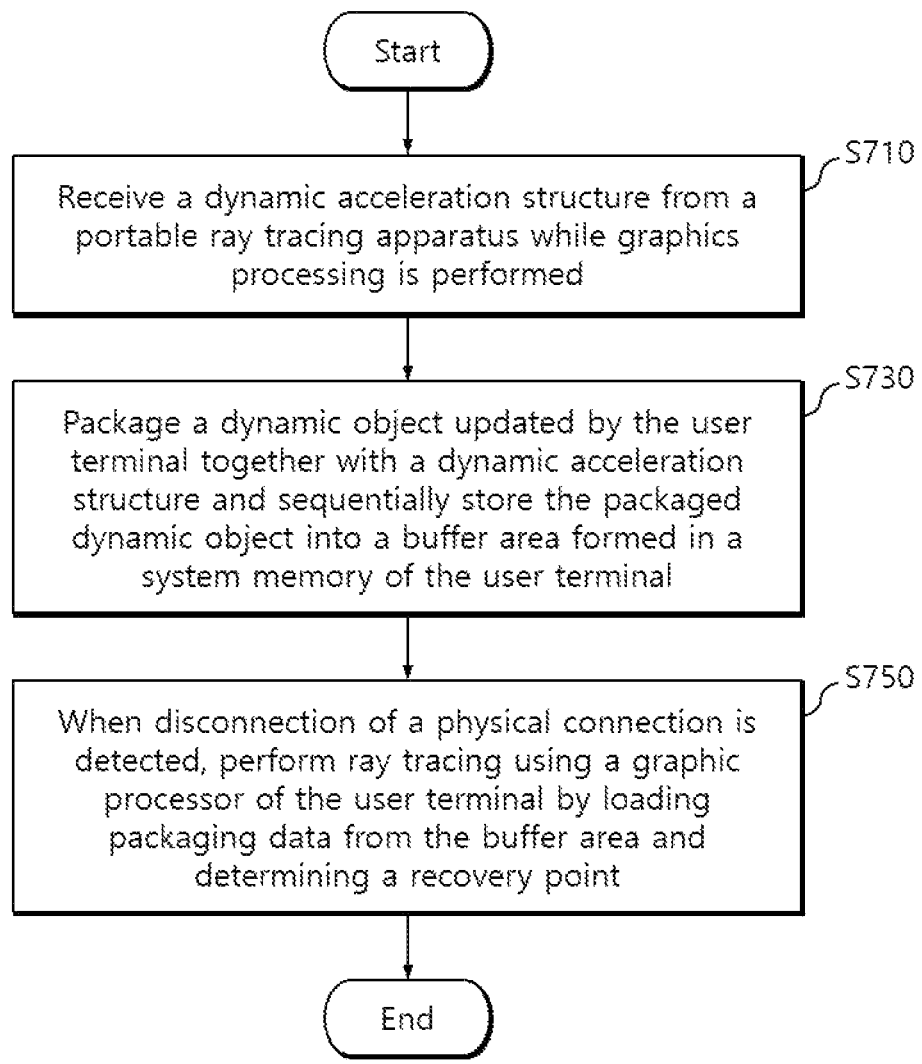

BUFFERING METHOD IN PORTABLE RAY TRACING SYSTEM

CROSS-REFERENCE TO PRIOR APPLICATION

This application claims priority to Korean Patent Application No. 10-2019-0042391, filed on Apr. 11, 2019, which is hereby incorporated by reference in its entirety.

BACKGROUND

The present invention relates to a buffering method in a portable ray tracing system and, more particularly, to a buffering method in a portable ray tracing system which provides smooth graphics processing when a physical connection is disconnected during a synchronized graphics process.

3D graphics technology is a technology used for three-dimensional representation of geometry data stored in a computing device and is widely used today for various industries including media and game industries. In general, 3D graphics technology requires a large amount of computations, which inevitably involves a high-performance graphic processor. Ray tracing technique is capable of simulating various optical effects such as reflection, refraction, and shadow and capable of producing photorealistic 3D graphic images.

The Korea registered patent No. 10-1560283 (2015 Oct. 7) relates to a 3D image building method, a 3D image building machine which performs the method, and a storage media which stores 3D images, the 3D image building method comprising (a) determining a method for partitioning a given space and partitioning the given space into a plurality of subspaces (each of which forms a k-d tree node) and (b) repeating the step (a) by considering each of the plurality of subspaces as the given space, wherein, if the corresponding subspace corresponds to an internal node of the k-d tree, the step (a) includes checking whether the number of raw data belonging to the internal node exceeds a threshold.

The Korea laid-open patent No. 10-2014-0023615 (2014 Feb. 27) relates to a ray search unit based on a tree acceleration structure. The ray search unit includes a plurality of sub-pipeline units, each of which processes a different task required for the ray search employing the tree acceleration structure and operates in parallel with each other.

PRIOR ART REFERENCES

Patent References

Korea registered patent No. 10-1560283 (2015 Oct. 7)
Korea laid-open patent No. 10-2014-0023615 (2014 Feb. 27)

SUMMARY

One embodiment of the present invention provides a buffering method in a portable ray tracing system which provides smooth graphics processing when a physical connection is disconnected during a synchronized graphics process.

One embodiment of the present invention provides a buffering method in a portable ray tracing system capable of tracking an independent ray tracing process by packaging and storing a dynamic acceleration structure constructed in a portable ray tracing apparatus with dynamic objects.

When a physical connection is disconnected, one embodiment of the present invention provides a buffering method in a portable ray tracing system capable of recovering from a setback of a graphics process by performing ray tracking from a recovery point to the point where the physical connection has been disconnected based on package data.

Among embodiments of the present invention, a buffering method in a portable ray tracing system comprises receiving a dynamic acceleration structure from the portable ray tracing apparatus during the process for performing a graphics process; packaging a dynamic object updated by the user terminal with the dynamic acceleration structure and sequentially storing the packaged dynamic object into a buffer area formed in a system memory of the user terminal; when disconnection of the physical connection is detected, performing ray tracing using a graphic processor of the user terminal by loading packaging data from the buffer area and determining a recovery point.

The receiving a dynamic acceleration structure may include updating a dynamic object stored in the system memory by the user terminal, sharing updated content of the dynamic object with the portable ray tracing apparatus through the synchronization, and receiving an acceleration structure reconstructed by the portable ray tracing apparatus based on the dynamic object as the dynamic acceleration structure.

The sequentially storing may include storing the packaging data in an external memory and storing, in the buffer area, only the address on the external memory through which the packaging data is accessed.

The sequentially storing may include updating a reference point periodically; if the reference point is updated, generating and storing shape information of a dynamic object at the corresponding reference point; extracting update information about the dynamic object based on the shape information; and packaging the update information together with the dynamic acceleration structure and sequentially storing the packaged information in the buffer area.

The performing ray tracing may include determining a reference point closest to the point at which disconnection of the physical connection has been detected as the recovery point among a plurality of reference points.

The performing ray tracing may include determining the recovery point based on the number of packaging data stored in the buffer area and the frame rate at which the packaging data are processed by the graphic processor.

The performing ray tracing may include determining disconnection of the physical connection based on whether an electrical signal received from a connection port which provides the physical connection is blocked.

The performing ray tracing may include generating an image for each frame by performing a ray generation step, traversal & intersection test step, shading step, and texture mapping step sequentially.

BRIEF DESCRIPTION OF THE DRAWINGS

FIG. 6 illustrates a functional structure of the disconnect processing unit of FIG. 5.

FIG. 7 is a flow diagram illustrating a buffering process performed by the disconnect processing unit of FIG. 5.

DETAILED DESCRIPTION

Figure 1:
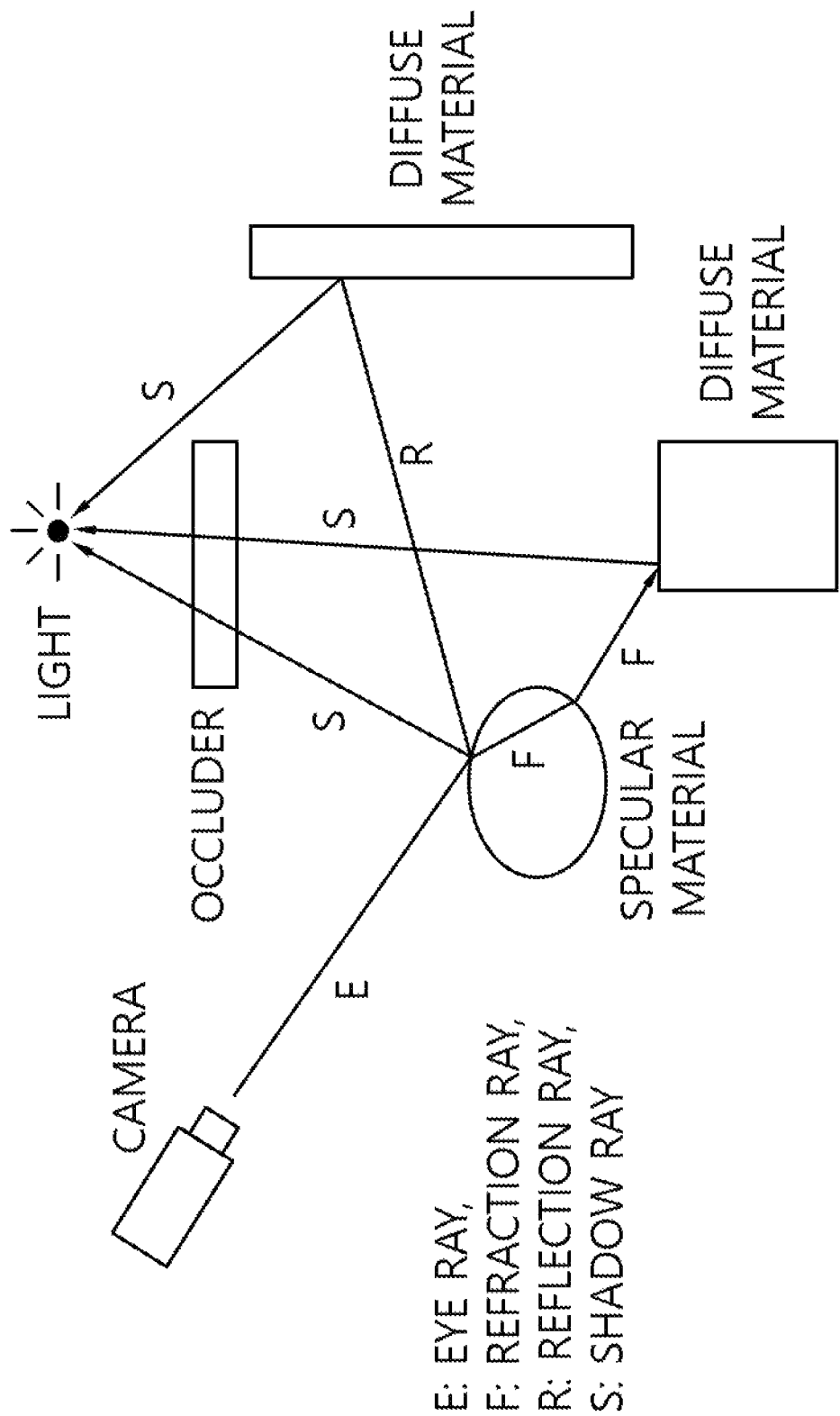
FIGS. 1 and 2 illustrate a ray tracing process performed in a portable ray tracing system according to one embodiment of the present invention.

Since description of the present invention is merely an embodiment for illustrating structural or functional description, it should not be interpreted that the technical scope of the present invention is limited by the embodiments described in this document. In other words, embodiments may be modified in various ways and implemented in various other forms; therefore, it should be understood that various equivalents realizing technical principles of the present invention belong to the technical scope of the present invention includes. Also, since it is not meant that a specific embodiment should support all of the purposes or effects intended by the present invention or include only the purposes or effects, the technical scope of the disclosed invention should be not regarded as being limited to the descriptions of the embodiment.

Meanwhile, implication of the terms used in this document should be understood as follows.

The terms such as "first" and "second" are introduced to distinguish one element from the others, and thus the technical scope of the present invention should not be limited by those terms. For example, a first element may be called a second element, and similarly, the second element may be called the first element.

If a constituting element is said to be "connected" to other constituting element, the former may be connected to the other element directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe the operation order of the steps. Therefore, unless otherwise explicitly indicated in the context of description, the steps may be executed differently from the stated order. In other words, the respective steps may be performed in the same order as stated in the description, actually performed simultaneously, or performed in a reverse order.

The present invention may be implemented in the form of program codes in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device. Also, a computer-readable recording medium may be distributed may be distributed over computer systems connected to each other through a network so that computer-readable codes may be stored and executed in a distributed manner.

Unless defined otherwise, all of the terms used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

Figure 2:
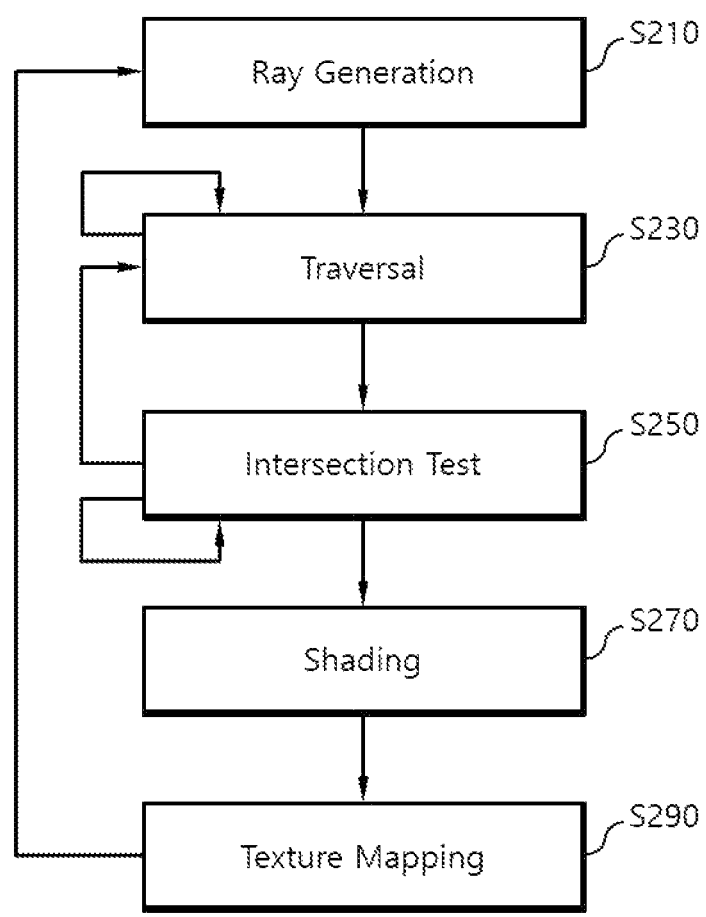

FIGS. 1 and 2 illustrate a ray tracing process performed in a portable ray tracing system according to one embodiment of the present invention.

Referring to FIG. 1, an eye ray (E) is generated at the camera position for each pixel, and calculations are carried out to find an object hit by the ray (E). If the object hit by the corresponding ray (E) is a specular material which refracts the ray or a diffuse material which reflects the ray, a refraction ray (F) simulating the refraction effect and/or a reflection ray (R) simulating the reflection effect is generated at the point the corresponding ray (E) meets the object, and a shadow ray (S) may be generated in the direction of light. In one embodiment, if a shadow ray (S) hits another object (occluder), a shadow may be generated at the point where the corresponding shadow ray (S) has been generated.

Referring to FIG. 2, the ray tracing process may be performed recursively and may include (i) eye ray generation step S210, (ii) acceleration structure (AS) traversal step S230, (iii) intersection test step S250, (iv) shading step S270, and (v) texture mapping step S290.

The eye ray generation step S210 may generate at least one ray based on eye ray generation information and shading information. Eye ray generation information may include screen coordinates for generating an eye ray, and shading information may include a ray index for obtaining screen coordinates, coordinates of a ray-triangle hit point, color value, and shading ray type. Also, shading information may further include additional information according to the shading ray type.

Here, a shading ray may include a shadow ray (S), secondary ray or NULL ray; and the secondary ray may include a refraction ray (F) and/or reflection ray (R). The refraction ray (F) may include the refractive index of a ray-triangle hit point as additional information, and the reflection ray (R) may include reflectance of the ray-triangle hit point as additional information.

The acceleration structure traversal step S230 may find a leaf node which intersects a ray by searching nodes based on the acceleration structure. Here, the acceleration structure may correspond to a k-d tree, and the traversal process of the acceleration structure may correspond to recursion of the k-d tree.

The intersection test step S250 may correspond to a ray-triangle intersection test, which may read a triangle list belonging to a leaf node intersecting a ray and perform an intersection test for a given ray based on the coordinates of the corresponding triangle list. The shading step S270 may calculate the color value of the ray-triangle hit point and deliver shading information including the coordinates, color value, and shading ray type of the ray-triangle hit point to the next step. The texture mapping step S290 may generate an image for a current frame through texture mapping.

Since an image of a current frame may include both of a static and dynamic objects in the ray tracing process, the ray-triangle intersection test may be performed for each of the first and the second acceleration structures, and ray tracing may be performed based on the acceleration structure where ray meets triangles in the first or second acceleration structure. During the ray tracing process, if the ray intersects a triangle in both of the first and the second acceleration structure, an acceleration structure for ray tracing may be determined based on the viewpoint of the ray and distances of the respective triangles hit by the ray.

In other words, since a triangle at a short distance may correspond to an object located close to the viewer, a triangle yielding a short distance among the respective distances of the triangles which intersect the viewpoint of the ray may be selected. For example, suppose the distance between the eye viewpoint and an intersecting triangle of the first acceleration structure is S1, and the distance between the eye viewpoint and an intersecting triangle of the second acceleration structure is S2. If S1 is shorter than S2, ray tracing may be performed based on the triangle intersecting the first acceleration structure while, if S2 is shorter than S1, ray tracing may be performed based on the triangle intersecting the second acceleration structure.

Figure 3:
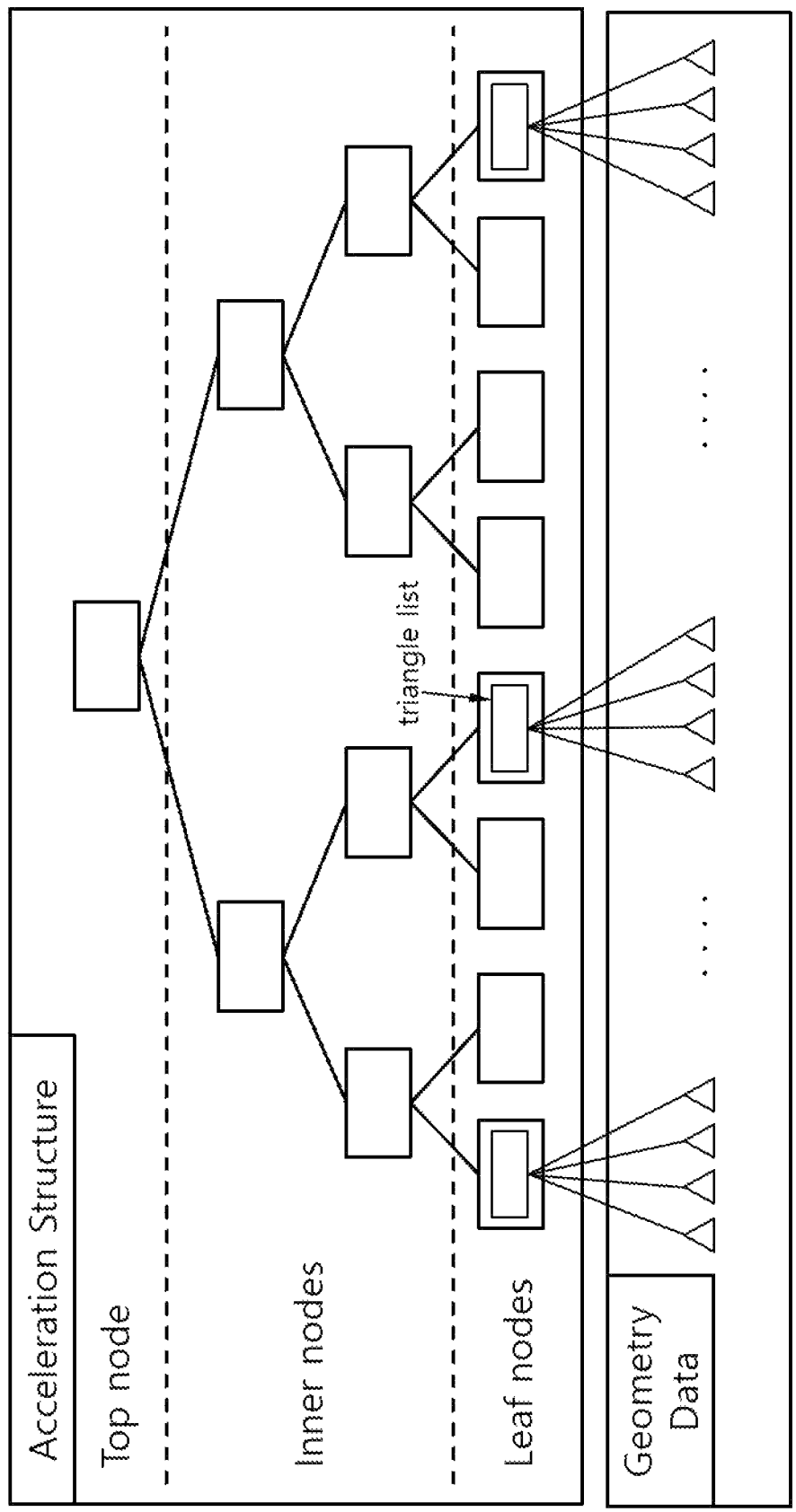
FIG. 3 illustrates an acceleration structure and geometry data used in a ray tracing process.

FIG. 3 illustrates an acceleration structure and geometry data used in a ray tracing process.

Referring to FIG. 3, the acceleration structure (AS) may include a k-d tree (k-depth tree) or bounding volume hierarchy (BVH) commonly used for ray tracing. FIG. 3 illustrates an acceleration structure based on a k-d tree.

A k-d tree is one of spatial partitioning tree structures, which may be used for the ray-triangle intersection test. A k-d tree may include a top node, inner nodes, and leaf nodes, where a leaf node may include a triangle list for pointing at least one triangle included in the geometry data. In one embodiment, if triangle information included in the geometry data is implemented in the form of an array, the triangle list included in the leaf node may correspond to an array index.

Figure 4:
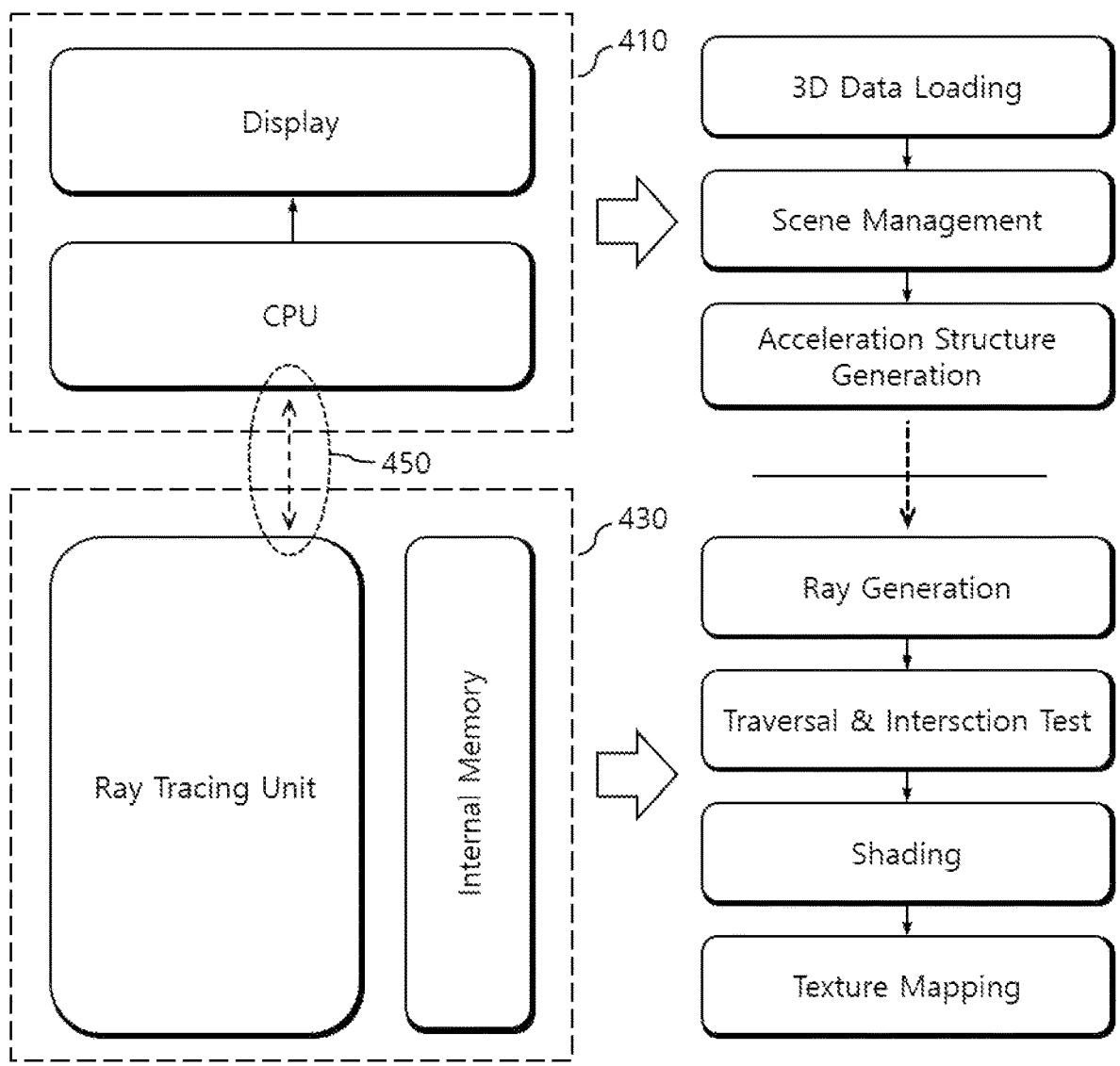
FIG. 4 illustrates a portable ray tracing system according to one embodiment of the present invention.

FIG. 4 illustrates a portable ray tracing system according to one embodiment of the present invention.

Referring to FIG. 4, a portable ray tracing system 400 may include a user terminal 410 and portable ray tracing apparatus 430. The user terminal 410 and the portable ray tracing apparatus 430 may be physically connected to each other through a connection port attached to each of them.

The user terminal 410 may correspond to a computing device capable of graphics processing and checking the result thereof; and may be implemented by a smartphone, notebook, or computer; however, the user terminal is not necessarily limited to the aforementioned examples and may be implemented by various devices such as a tablet PC. The user terminal 410 may be implemented by using a graphic processor for graphics processing separately from the Central Processing Unit (CPU), where, in this case, the graphic processor may correspond to the Graphic Processing Unit (GPU).

Also, the user terminal 410 may be implemented by including a connection port therein for connecting physically to the portable ray tracing apparatus 430. The connection port may correspond to an Input/Output (I/O) interface for a physical connection between the user terminal 410 and the portable ray tracing apparatus 430, which may be implemented by a USB type-c port, for example. Depending on the needs, a plurality of user terminals 410 may be connected to the portable ray tracing apparatus 430 simultaneously.

The portable ray tracing apparatus 430 may correspond to an apparatus capable of supporting part of graphics processing operations and may be implemented in the form of a portable device. The portable ray tracing apparatus 430 may include a connection port for physically connecting the portable ray tracing apparatus 430 to the user terminal 410. The portable ray tracing apparatus 430 may be implemented by including a ray tracing unit performing ray tracing and an internal memory. Here, the ray tracing unit may correspond to a graphic processor which performs ray tracing. Also, the portable ray tracking apparatus 430 may receive power for ray tracing from the user terminal 410.

In one embodiment, the user terminal 410 and the portable ray tracing apparatus 430 may perform synchronized graphics processing through a physical connection established between them. More specifically, the user terminal 410 may perform a 3D data loading step, scene management step, and acceleration structure generation step sequentially; and the portable ray tracing apparatus 430 may perform a ray generation step, traversal & intersection test step, shading step, and texture mapping step sequentially.

The 3D data loading step may receive geometry data from an external storage device and store the received geometry data to the system memory or store the geometry data received through a network to the system memory. The scene management step may generate and/or update a static scene and dynamic scene based on the geometry data. The acceleration structure generation step may generate an acceleration structure related to a static object comprising a static scene and a dynamic object comprising a dynamic scene.

The ray generation step may generate at least one ray based on ray generation information and shading information. The traversal & intersection test step may find a leaf node intersecting a ray by searching nodes in an acceleration structure, read a triangle list included in the leaf node, and perform an intersection test against a given ray based on the coordinates of the corresponding triangle list. The shading step may calculate the color value of a ray-triangle hit point and generate shading information including the coordinates, color value, and shading ray type of the ray-triangle hit point. The texture mapping step may generate an image for a current frame through texture mapping.

As a result, the user terminal 410 and the portable ray tracing apparatus 430 may repeatedly perform a process for generating an image for each frame through synchronized graphics processing. However, if a physical connection is disconnected during a synchronized graphics process, data managed separately by the respective devices may be damaged or lost; therefore, a means for recovering effectively to a previous state may be needed.

Figure 5:
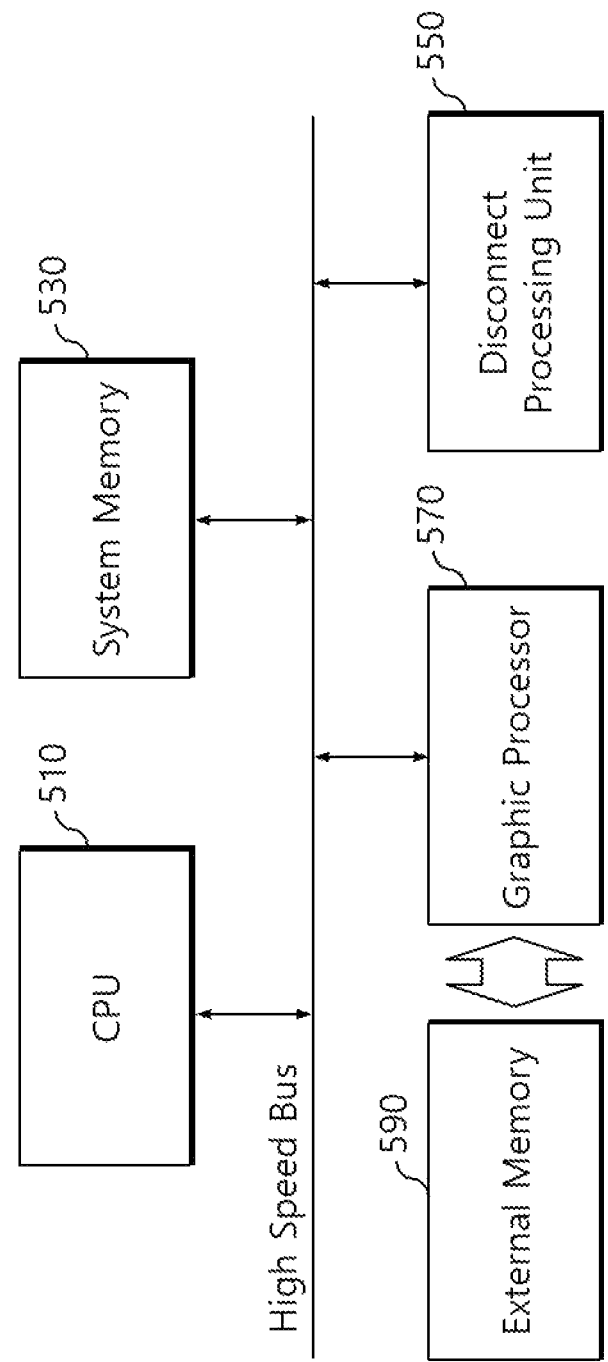
FIG. 5 illustrates one embodiment of a physical structure of the user terminal of FIG. 4.

FIG. 5 illustrates one embodiment of a physical structure of the user terminal of FIG. 4.

Referring to FIG. 5, the portable ray tracing apparatus 430 may include a central processing unit 510, system memory 530, disconnect processing unit 550, graphic processor 570, and external memory 590. The central processing unit 510, system memory 530, disconnect processing unit 550, and graphic processor 570 may transfer data to each other through high speed bus.

The Central Processing Unit (CPU) 510 may control the overall operation of the user terminal 410 and support graphics processing in conjunction with the operation of the graphic processor 570. Also, the CPU 510 may control the operation due to synchronization with the portable ray tracing apparatus 430. In other words, the CPU 510 may control part of graphics processing operations handled by the user terminal 410 according to synchronization with the portable ray tracing apparatus 430; for example, the CPU 510 may construct a static acceleration structure for static objects, process 3D applications, or reproduce images generated as a result of graphics processing through a display.

The system memory 530 may be accessed by the CPU 510 or graphic processor 570; and store data required for graphics processing. For example, the system memory 530 may store geometry data related to triangle information comprising a 3D scene and texture data for texture patterns.

The disconnect processing unit 550 may detect disconnection of a physical connection between the user terminal 410 and the portable ray tracing apparatus 430 and process buffering for recovering to a previous state. To this purpose, the disconnect processing unit 550 may operate in conjunction with the CPU 510 and the graphic processor 570; and obtain an access right to the system memory 530. Specific operations of the disconnect processing unit 550 will be described in more detail with reference to FIG. 6.

The graphic processor 570 may perform ray tracing for graphics processing, operate in conjunction with the CPU 510, and to this purpose, obtain an access right to the system memory 530. Also, when synchronization due to a physical connection between the user terminal 410 and the portable ray tracing apparatus 430 is in progress, the graphic processor 570 may perform only a limited role in graphics processing.

In one embodiment, the graphic processor 570 may construct a dynamic acceleration structure based on dynamic objects, perform ray tracing based on static and dynamic acceleration structures, and provide a ray tracing result to the CPU 510.

The external memory 590 may temporarily store information processed by the graphic processor 570; and store geometry data and acceleration structures, texture data, and color information related to related to static and dynamic objects.

In one embodiment, different from FIG. 5, the external memory 590 may correspond to part of the system memory 530, where the external memory 590 and the system memory 530 may be separated only from a logical viewpoint and implemented being integrated in one memory depending on the needs.

FIG. 6 illustrates a functional structure of the disconnect processing unit of FIG. 5.

Referring to FIG. 6, the disconnect processing unit 550 may include a dynamic acceleration structure receiving unit 610, packaging processing unit 630, ray tracing performing unit 650, and controller 670.

The dynamic acceleration structure receiving unit 610 may receive a dynamic acceleration structure from the portable ray tracing apparatus 430 while a graphics process is in progress. The user terminal 410 and the portable ray tracing apparatus 430 may exchange data for graphics processing through the input/output interface 450 formed by a physical connection between them, where the user terminal 410 may receive a dynamic acceleration structure constructed during a ray tracing process for each frame through the dynamic acceleration structure receiving unit 610.

In one embodiment, the dynamic acceleration structure receiving unit 610 may process a reception operation by sequentially performing updating dynamic objects stored in the system memory 530 by the user terminal 410, sharing updated content of the dynamic objects with the portable ray tracing apparatus 430 through synchronization, and receiving an acceleration structure reconstructed by the portable ray tracing apparatus 430 based on the dynamic objects as a dynamic acceleration structure.

In other words, the dynamic acceleration structure received from the portable ray tracing apparatus 430 may be constructed based on dynamic objects updated periodically by the user terminal 410; and the user terminal 410 and the portable ray tracing apparatus 430 may take charge of part of the whole graphics process respectively, thereby providing enhanced graphics processing performance.

The packaging processing unit 630 may package a dynamic object updated by the user terminal 410 together with a dynamic acceleration structure and store the packaged dynamic object sequentially in a buffer area formed in the system memory 530 of the user terminal 410. The buffer area may be formed in the system memory 530 as part of the memory, and an access right may be limited so that the buffer area is accessed only by the user terminal 410. Packaging may correspond to the act of grouping data in a temporary form for preliminary recovery, where integration and compression of data may be performed several times during the packaging process.

Among objects comprising a 3D scene, a dynamic object whose position and state are changed needs to be updated at each frame by reflecting the change information. And a dynamic acceleration structure constructed by the portable ray tracing apparatus 430, as information used for ray tracing to that purpose, may be integrated together with information about the dynamic object and stored in a specific location, and thereby recovery to a previous state may be performed promptly at the time of disconnection of a physical connection.

In one embodiment, the packaging processing unit 630 may store packaging data in the external memory 590 and store, in the buffer area, only the address on the external memory 590 through which the package data may be accessed. Since the system memory 530 may be used not only for graphics processing but also overall operation control of the user terminal 410, packaging data which occupies large space may be stored in a separate space, namely external memory 590, and only the address through which the corresponding external memory 590 is accessed may be stored in the buffer area, which thereby allows efficient use of memory space.

In one embodiment, the packaging processing unit 630 may process a packaging operation by sequentially performing updating a reference point periodically; when the reference point is updated, generating and storing shape information about a dynamic object at the corresponding reference point; extracting change information about a dynamic object based on the shape information; and packaging the change information together with a dynamic acceleration structure and sequentially storing the packaged information in a buffer area.

Here, a reference point may correspond to the point at which an image for each frame generated through ray tracing is finally reproduced through a display and may be used to update information about a periodically displayed image. In other words, images generated through ray tracing after the reference point may be stored in a specific area on the memory, for example, frame buffer and may be reproduced through a display by the control of the CPU 510.

In one embodiment, the packaging processing unit 630 may process a packaging operation by sequentially processing updating a reference point periodically; calculating the number of shape information stored in a buffer area when the reference point is updated; when the number of shape information is the same as a reference number, deleting shape information the generation time of which is the earliest from the buffer area and generating and storing shape information about a dynamic object at the corresponding reference point; extracting change information about a dynamic object based on shape information; and packaging the change information together with a dynamic acceleration structure and sequentially storing the packaged data in the buffer area.

If a change occurs in a dynamic object with respect to the dynamic object at a reference point, the packaging processing unit 630 may collect only the corresponding change information and package the collected information together with a dynamic acceleration structure, thereby reducing size of the packaging data. The shape information about a dynamic object is information about the dynamic object at a specific point, which may be expressed in a form that may be compared with the dynamic object at a different point.

When disconnection of a physical connection is detected, the ray tracing performing unit 650 may load packaging data from the buffer area, determine a recovery point, and perform ray tracing due to the graphic processor 570 of the user terminal 410. When an unexpected disconnection is occurred, it is not easy to get a support for the ray tracing operation from the portable ray tracing apparatus 430, the user terminal 410 may perform a built-in operation for ray tracing.

In one embodiment, among a plurality of reference points, the ray tracing performing unit 650 may determine a reference point closest to the point at which disconnection of a physical connection has been detected as a recovery point. A plurality of reference points may be stored in the buffer area of the system memory 530; and the ray tracing performing unit 650 may determine an appropriate recovery point base on the point at which disconnection of a physical connection has been detected and control buffering to be performed promptly and smoothly. The ray tracing performing unit 650 may determine a recovery point based on the interval between points and perform ray tracing.

In one embodiment, the ray tracing performing unit 650 may determine a recovery point based on the number of packaging data stored in the buffer area and the frame rate at which the packaging data are processed by the graphic processor 570. The number of packaging data may correspond to the number of packaging data stored during a period ranging from a recovery point to the point at which disconnection of a physical connection has been detected; and the frame rate may correspond to a ratio of the number of dynamic acceleration structures constructed by the graphic processor 570 to the number of images generated by ray tracing per hour. A higher frame rate may indicate that the number of processed images is higher than the number of dynamic acceleration structures constructed.

As more packaging data are stored in the buffer area with respect to a point at which disconnection of a physical connection has been detected, the ray tracing performing unit 650 may determine a point closer to the detected point as a recovery point; meanwhile, if the frame rate handled by the graphic processor 570 becomes higher, the ray tracing performing unit 650 may determine a farther point as the recovery point.

In one embodiment, the ray tracing performing unit 650 may determine disconnection of a physical connection based on whether an electrical signal received from a connection port which provides the physical connection is blocked. If an electrical signal is generated from a physical connection, the ray tracing performing unit 650 may determine the physical connection from detection of the electrical signal while, if generation of an electrical signal disappears, the ray tracing performing unit 650 may determine that the physical connection has been disconnected. To this purpose, the ray tracing performing unit 650 may be implemented by including a signal collection motion collecting an electrical signal received from a connection port, change detection module detecting change of a collected electrical signal, and disconnection determination module determining disconnection of a physical connection based on a detected change.

In one embodiment, the ray tracing performing unit 650 may process a ray tracing operation by sequentially performing a ray generation step, traversal & intersection test step, shading step, and texture mapping step. In other words, after constructing a dynamic acceleration structure based on an updated dynamic object, the ray tracing performing unit 650 may perform a ray tracing process comprising a series of steps to generate an image for a current frame or output the generated image through a display.

In one embodiment, the ray tracing performing unit 650 may store an image for each frame into the system memory 530 or a frame buffer allocated to the external memory 590; and display the image in real-time or periodically through a display.

The controller 590 may control the overall operation of the disconnect processing unit 550 and manage a control flow or a data flow among the dynamic acceleration structure receiving unit 610, packaging processing unit 630, and ray tracing performing unit 650.

FIG. 7 is a flow diagram illustrating a buffering process performed by the disconnect processing unit of FIG. 5.

Referring to FIG. 7, the disconnect processing unit 550 may receive a dynamic acceleration structure from the portable ray tracing apparatus 430 while graphics processing is performed through the dynamic acceleration structure receiving unit 610, S710. The disconnect processing unit 550 may package a dynamic object updated by the user terminal 410 together with a dynamic acceleration structure through the packaging processing unit 630 and sequentially store the packaged dynamic object in a buffer area formed in the system memory of the user terminal 410, S730.

Also, when disconnection of a physical connection is detected through the ray tracing performing unit 650, the disconnect processing unit 550 may perform ray tracing using a graphic processor 570 of the user terminal 410 by loading packaging data from the buffer area and determining a recovery point S750.

Although the present invention has been described with reference to preferred embodiments given above, it should be understood by those skilled in the art that various modifications and variations of the present invention may be made without departing from the technical principles and scope specified by the appended claims below.

The disclosed invention may provide the following effects. However, since it is not meant that a specific embodiment has to provide all of the following effects or only the effects, the technical scope of the disclosed invention should not be regarded as being limited by the specific embodiment.

A buffering method in a portable ray tracing system according to one embodiment of the present invention may track an independent ray tracing process by packaging and storing a dynamic acceleration structure constructed in a portable ray tracing apparatus with dynamic objects.

When a physical connection is disconnected, a buffering method in a portable ray tracing system according to one embodiment of the present invention may recover from a setback of a graphics process by performing ray tracking from a recovery point to the point where the physical connection has been disconnected based on package data.

What is claimed is:

1. In a buffering method performed in a portable ray tracing system including a user terminal and a portable ray tracing apparatus and performing synchronized graphics processing through a physical connection between the user terminal and the portable ray tracing apparatus, the buffering method comprising:
receiving a dynamic acceleration structure from the portable ray tracing apparatus during the process for performing a graphics process;
packaging a dynamic object updated by the user terminal with the dynamic acceleration structure and sequentially storing the packaged dynamic object into a buffer area formed in a system memory of the user terminal;
when disconnection of the physical connection is detected, performing ray tracing using a graphic processor of the user terminal by loading packaging data from the buffer area and determining a recovery point,
wherein the sequentially storing includes
updating a reference point periodically;
if the reference point is updated, generating and storing shape information of a dynamic object at the corresponding reference point;
extracting update information about the dynamic object based on the shape information; and
packaging the update information together with the dynamic acceleration structure and sequentially storing the packaged information in the buffer area.

2. The method of claim 1, wherein the receiving a dynamic acceleration structure includes
updating a dynamic object stored in the system memory by the user terminal;
sharing updated content of the dynamic object with the portable ray tracing apparatus through the synchronization; and
receiving an acceleration structure reconstructed by the portable ray tracing apparatus based on the dynamic object as the dynamic acceleration structure.

3. The method of claim 1, wherein the sequentially storing further includes storing the packaging data in an external memory and storing, in the buffer area, only the address on the external memory through which the packaging data is accessed.

4. The method of claim 1, wherein the performing ray tracing includes determining a reference point closest to the point at which disconnection of the physical connection has been detected as the recovery point among a plurality of reference points.

5. The method of claim 1, wherein the performing ray tracing includes determining disconnection of the physical connection based on whether an electrical signal received from a connection port which provides the physical connection is blocked.

6. The method of claim 1, wherein the performing ray tracing includes generating an image for each frame by performing a ray generation step, traversal & intersection test step, shading step, and texture mapping step sequentially.

7. In a buffering method performed in a portable ray tracing system including a user terminal and a portable ray tracing apparatus and performing synchronized graphics processing through a physical connection between the user terminal and the portable ray tracing apparatus, the buffering method comprising:
receiving a dynamic acceleration structure from the portable ray tracing apparatus during the process for performing a graphics process;
packaging a dynamic object updated by the user terminal with the dynamic acceleration structure and sequentially storing the packaged dynamic object into a buffer area formed in a system memory of the user terminal;
when disconnection of the physical connection is detected, performing ray tracing using a graphic processor of the user terminal by loading packaging data from the buffer area and determining a recovery point,
wherein the performing ray tracing includes determining the recovery point based on the number of packaging data stored in the buffer area and the frame rate at which the packaging data are processed by the graphic processor.

* * * * *